(12) United States Patent
Pooschen

(10) Patent No.: US 6,964,411 B2
(45) Date of Patent: Nov. 15, 2005

(54) COLUMN UNIT

(75) Inventor: Harald Pooschen, Koblenz (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 10/763,839

(22) Filed: Jan. 23, 2004

(65) Prior Publication Data

US 2004/0173954 A1 Sep. 9, 2004

(30) Foreign Application Priority Data

Jan. 25, 2003 (DE) ................. 103 02 984

(51) Int. Cl.⁷ ............................. A47C 3/30
(52) U.S. Cl. ............ 267/64.11; 16/66; 16/84; 267/131; 248/631
(58) Field of Search ................. 267/131, 132, 267/64.11, 64.12, 64.26; 188/300, 129, 381, 188/322.19; 248/161, 162.1, 631, 188.5, 248/406.1; 297/344.19, 301.2; 16/66–68, 16/84; 92/51–53, 15

(56) References Cited

U.S. PATENT DOCUMENTS

| 4,871,138 A | 10/1989 | Sauter |
| 5,188,345 A | 2/1993 | Siegner et al. |
| 5,497,966 A * | 3/1996 | Fuhrmann ............ 248/161 |
| 6,125,521 A | 10/2000 | Stumpf |

FOREIGN PATENT DOCUMENTS

| DE | 621149 | * 3/1934 |
| DE | 6753661 | 6/1968 |
| DE | 1 958 241 | 5/1971 |
| DE | 1 290 530 | 9/1972 |
| DE | 24 53 105 A1 | 5/1976 |
| DE | 35 22 386 A1 | 1/1987 |
| DE | 199 19 230 A1 | 11/2000 |
| DE | 10302984 | * 5/2004 |
| DE | 10302984 B3 | * 5/2004 |
| EP | 0 566 045 B2 | 10/1993 |
| EP | 1440633 A3 | * 8/2004 |

OTHER PUBLICATIONS

STIC provided translation of German 621149.*
STIC provided translation of DE19919230.*

* cited by examiner

Primary Examiner—Douglas C. Butler
(74) Attorney, Agent, or Firm—Cohen, Pontani, Lieberman & Pavane

(57) ABSTRACT

A column unit includes a fixed upright tube with a bottom upright-tube end and a top upright-tube end and a telescopic tube axially displaceably guided in the upright tube. A cylinder of a pneumatic spring is axially displaceably guided in the telescopic tube. A piston rod projecting out of the cylinder of the pneumatic spring has a free end fastened on the upright tube proximate the bottom upright-tube end. A carry-along stop of the cylinder of the pneumatic spring allows the telescopic tube to be carried along out of the upright tube when the pneumatic spring is moved axially. A securing element limits an axial movement of the telescopic tube out of the upright tube. The securing element is arranged on the upright tube and abuts the outer cylindrical lateral surface of the telescopic tube with radially inwardly directed resilient prestressing. A latching recess on the outer cylindrical lateral surface of the telescopic tube engages the securing element to latch into said latching recess when the telescopic tube has been moved out of the upright tube to a maximally withdrawn position.

20 Claims, 3 Drawing Sheets

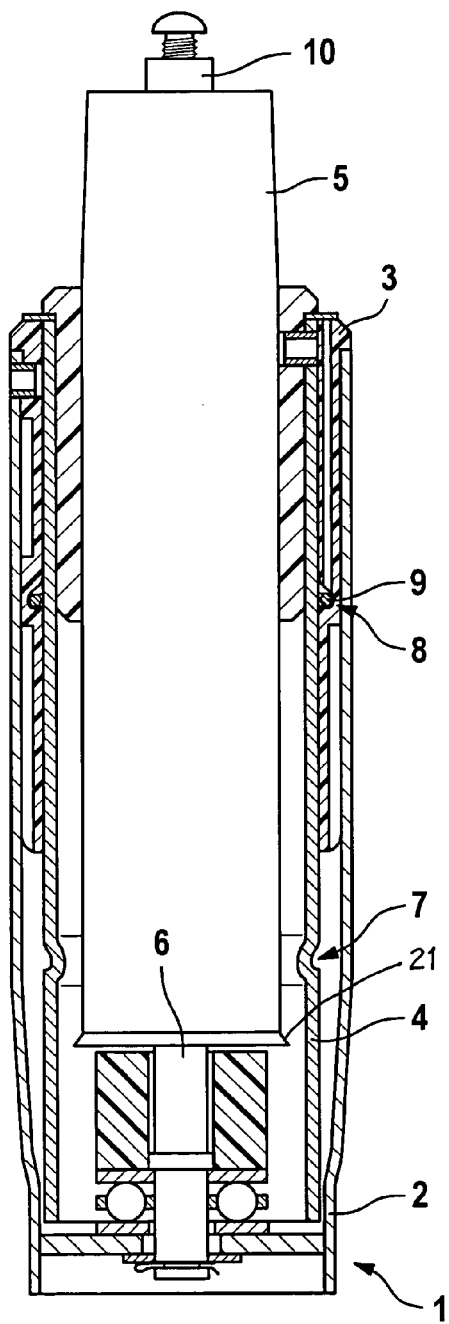
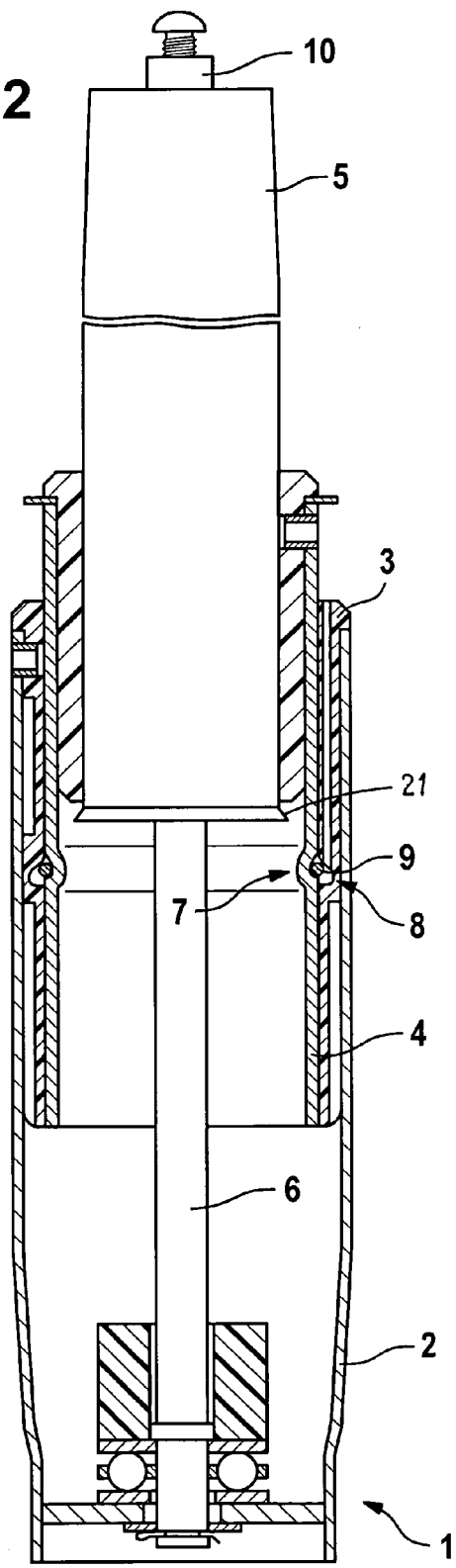

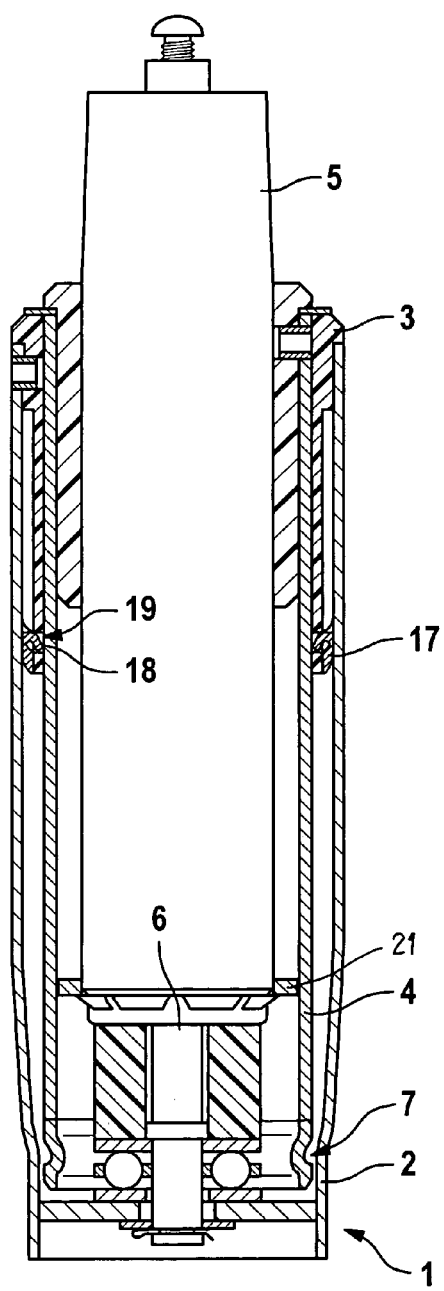
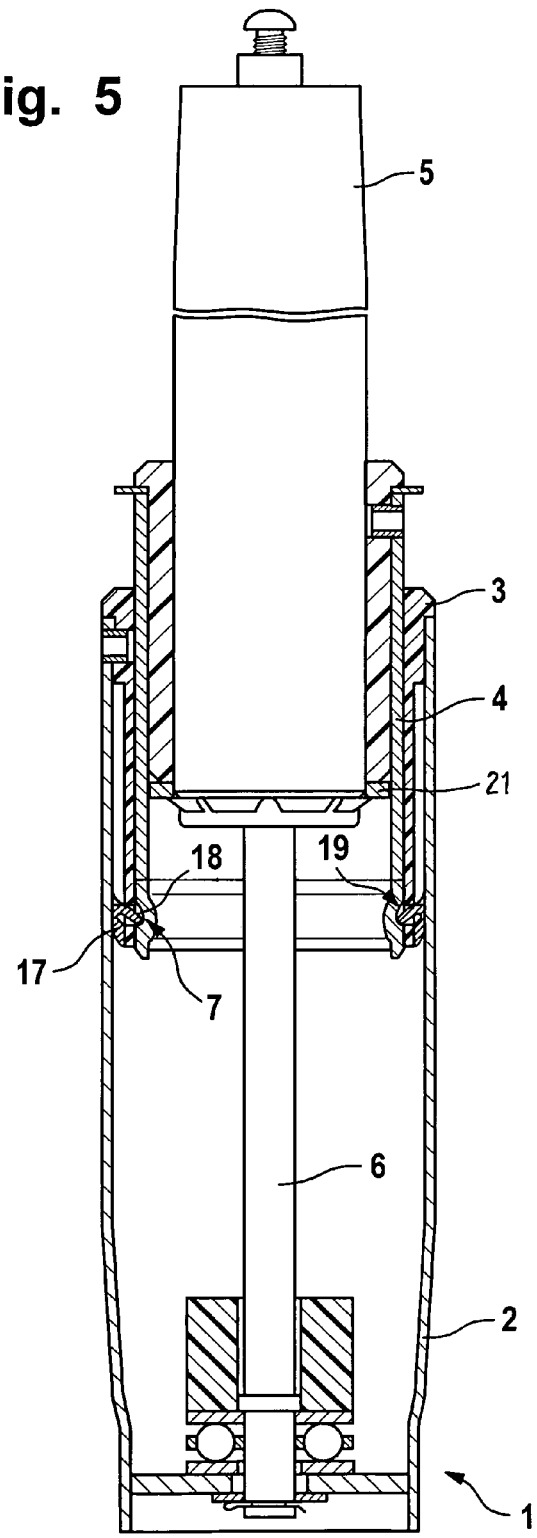

COLUMN UNIT

BACKGROUND OF THE INVENTION

1. Field of the Invention

The invention relates to a column unit for a chair having a fixed upright tube with a bottom upright-tube end and a top upright-tube end, a telescopic tube axially displaceably guided in the upright tube in the region of the top upright-tube end, a pneumatic spring having a cylinder and a piston rod, the cylinder being axially displaceably guided in the telescopic tube, the piston rod projecting out of the cylinder of the pneumatic spring and having a free end that is fastened on the upright tube proximate the bottom upright-tube end, the cylinder having a carry-along stop for carrying the telescopic tube out of the upright tube when the pneumatic spring is moved axially, and a securing element which limits an axial movement of the telescopic tube out of the upright tube.

2. Description of the Related Art

In known column units, a telescopic tube arranged in an axially movable manner in an upright tube is protected against undesired removal. For this purpose, the telescopic tube has a drawout-limiting pin which is subjected to loading by a leaf spring and engages a slot defined in the upright tube. The displacement which can be executed by the telescopic tube in relation to the upright tube is determined by the length of the slot. This method of securing against the telescopic tube being released from the upright tube requires high mechanical outlay. On the one hand, a slot has to be produced in the upright tube. On the other hand, it is necessary to install the drawout-limiting pin with the release spring in the telescopic tube.

Another known column unit includes a securing means with a drawout-limiting ring arranged in an annular recess of the telescopic tube. In this unit, a guide bushing is arranged in the upright tube having an internal diameter that is smaller than the external diameter of the drawout-limiting ring and larger than the external diameter of the telescopic tube. The bottom end of the guide bushing forms a stop against which the drawout-limiting ring strikes when the telescopic tube is extended. The arrangement of the drawout-limiting ring in an annular recess of the telescopic tube results in an increase in the overall length of the telescopic tube which cannot be utilized for the height adjustment. When a predetermined minimum drawout force is exceeded during withdrawal, the elasticity of the drawout-limiting ring allows it to be forced out of the annular recess by the stop and stripped off. A drawout-limiting ring with a high elasticity allows easy removal for maintenance. A disadvantage of this is that the drawout limiting ring has a low minimum drawout force, which may result in undesired removal and thus in the components failing completely. Added to this is the further disadvantage that the known securing means are arranged at the end of the telescopic tube. In the case of the column unit being subjected to force deviating from the longitudinal axis, the highest loading occurs in the region of the securing means, which reduces the service life of the securing means.

SUMMARY OF THE INVENTION

The object of the present invention is to provide a column unit of the type mentioned in the introduction which better protects the securing means against an application of force deviating from the longitudinal axis than the prior art. It is further intended for the securing means to manage without the overall length being extended. Furthermore, the intention is for the securing means to be of straightforward construction and to be easy to install and not to result in the diameter of the telescopic tube being increased.

The object is achieved according to the present invention in that the securing element is arranged on the upright tube and abuts an outer cylindrical lateral surface of the telescopic tube with radially inwardly directed resilient pre-stressing, the telescopic tube having a latching recess on its outer cylindrical lateral surface so that the securing element may be latched radially into said latching recess when the telescopic tube has been moved out of the upright tube to a maximally withdrawn position.

The arrangement of the securing element in a stationary manner in the upright tube avoids the requirement that the securing element be arranged at the bottom end of the telescopic tube. The shifting of the placement of the securing element out of the critical region of the telescopic tube into the more or less safe region in the upright tube considerably reduces the transverse loading on the securing element as a result of an application of force deviating from the longitudinal axis. Furthermore, this relocation of the securing element also shortens the overall length of the telescopic tube compared to the prior art. This advantage is particularly effective, in particular, in the case of securing elements with relatively large axial and radial extents. The diameter of the telescopic tube is not increased here.

Particularly good guidance even in the fully extended state of the telescopic tube is achieved if the latching recess is arranged in that end region of the telescopic tube which is directed towards the bottom upright-tube end.

The securing element may be arranged in a securing recess of the upright tube, wherein the recess is open in the direction of the telescopic tube. This arrangement allows the diameter of the column unit to be kept small.

For smooth displaceability and largely play-free guidance of the telescopic tube, the upright tube may have a firmly inserted guide bushing, in which the telescopic tube is axially displaceably guided. In this case, the securing recess of the upright tube may be formed in the guide bushing.

To accommodate the securing element in full, the securing recess in the upright tube has a depth which corresponds approximately to the radial extent of the securing element. This ensures unobstructed adjustment of the axial position of the telescopic tube within the upright tube.

The accommodation of the securing element in the upright tube is adapted in configuration to the securing element. In the simplest case, the securing recess of the upright tube is a radially encircling groove-like bead.

Various functions may be realized by the bead if the bead has an asymmetric cross section.

The bead may be used as a stop for the securing element if the bead has a radially inner bead base, a first side wall which is closer to the top upright-tube end, and a second side wall which is further away from the top upright-tube end, the first side wall being inclined in a ramp-like manner in relation to the top upright-tube end, and the second side wall extending to the inner cylindrical lateral surface of the guide bushing approximately at right angles to the longitudinal axis of the column unit. In this configuration, the securing element strikes against the first side wall during a drawout movement and thus results in the drawout movement being limited.

The first side wall direction, runs as a slope in relation to the longitudinal axis of the column unit. The securing element runs on this slope as it is pushed in and is thus forced outwards into the securing recess in the upright tube. A shallow slope in relation to the longitudinal axis results in the securing element being deflected without any significant force being applied in addition.

The latching recess of the telescopic tube is preferably also a radially encircling groove-like bead, which may likewise have an asymmetric cross section.

If the bead of the telescopic tube has a radially inner bead base, a first side wall which is closer to the top upright-tube end, and a second side wall which is further away from the top upright-tube end, the first side wall being inclined in a ramp-like manner in relation to the top upright-tube end, and the second side wall extending to the outer cylindrical lateral surface of the telescopic tube, approximately at right angles to the longitudinal axis of the column unit, then the same functions and advantages are achieved as for the correspondingly designed securing recess.

The securing recess and/or the latching recess may be produced in a cost-effective manner by deformation or machining.

Machining of the telescopic tube for producing the latching recess may be dispensed with if a separate component with a radially encircling latching recess on its circumference is arranged on the telescopic tube.

The securing element may be arranged with radially inwardly directed prestressing in the securing recess of the upright tube.

The securing element may be made of an elastic material and accommodated under stress in the upright tube. The securing element consequently passes of its own accord into the latching recess located in the telescopic tube, and thus secures the column unit against undesired removal. Accordingly, additional elements for moving the securing element are obviated.

A securing element consisting of metal has proved advantageous since these securing elements have sufficient strength and stability even under relatively high loading.

An annular spring element which has a radially inwardly resilient region, such as resilient tongues, has been found to be an advantageous configuration of the securing element. It is thus the case that only the resilient region passes into the latching recess in the telescopic tube when the securing recess in the upright tube and the latching recess in the telescopic tube are located opposite one another.

The securing element may be designed as a spring ring. On account of its straightforward construction, the demands which this securing element places on the securing recess and latching recess are not at all significant, with the result that a spring ring secures the column unit in a very cost-effective manner against undesired removal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 1 is a longitudinal sectional view of a first embodiment of a column unit according to the present invention in a pushed-in state;

FIG. 2 is a longitudinal sectional view of the column unit according to FIG. 1 in the drawn-out state;

FIG. 4 is a longitudinal sectional view of a second embodiment of a column unit according to the present invention in the pushed-in state; and FIG. 5 is a longitudinal sectional view of the column unit from FIG. 4 in the drawn-out state.

DETAILED DESCRIPTION OF THE PRESENTLY PREFERRED EMBODIMENTS

Figure 3:
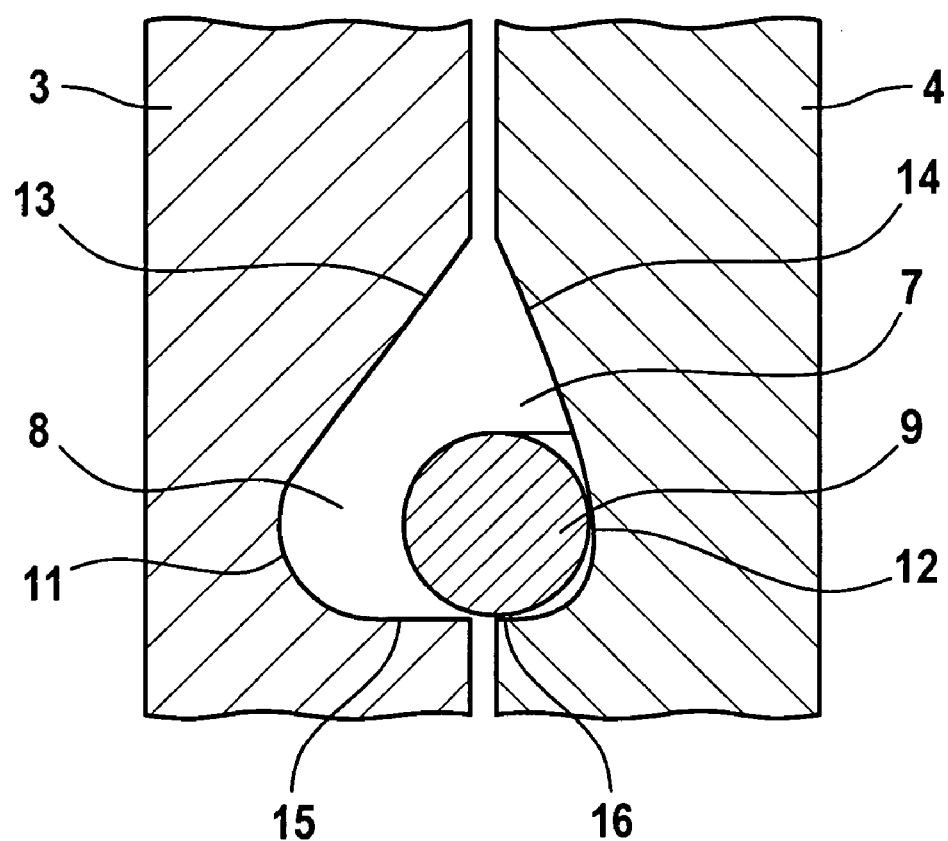
FIG. 3 is an enlarged view of the securing recess and the latching recess of the column unit according to FIG. 2.

The column unit 1 in FIG. 1 includes an upright tube 2 in which a guide bushing 3 is inserted. An axially movable telescopic tube 4 is arranged in the guide bushing 3. The telescopic tube 4 accommodates a pneumatic spring 5 having a piston rod 6 with a free end that is clamped in a rotatable manner in the upright tube 2. Apart from its free end, the piston rod 6 is accommodated in the pneumatic spring 5.

The bottom region of the telescopic tube 4 has a bead 7 which encircles the outer circumference thereof. The bead 7 is formed in the telescopic tube 4 by deformation. An annular encircling bead 8 is also formed on the inner circumference in the center of the guide bushing 3. The bead 8 is thus located in a region in which barely any loading occurs when the column unit 1 is subjected to the action of force or moments that are not parallel to the longitudinal axis of the column unit. This loading occurs to a more pronounced extent at the two ends of the telescopic tube 4.

A spring ring 9 with a circular cross section is arranged in the bead 8. The internal diameter of the spring ring 9 is smaller than the external diameter of the telescopic tube 4. Since it is arranged in the bead 8, the spring ring 9 is widened and thus encompasses the telescopic tube 4 with radially inwardly directed resilient prestress. The widened spring ring 9 is axially retained in this position by the bead 8.

In FIG. 2, the column unit 1 has been drawn out. This adjustment is effected by an initiating push rod 10 which opens a blocking valve (not illustrated) in the pneumatic spring 5. If there is no force acting vertically on the column unit 1, the pneumatic spring 5 is moved upwards against the firmly clamped-in free end of the piston rod 6. In this extending direction, the pneumatic spring 5 carries along the telescopic tube 4 via a stop 21 which is formed by an increase in the diameter of the pneumatic spring 5. This extending movement of the telescopic tube 4 is possible until the bead 8 reaches the bead 7. As soon as the two beads 7, 8 are located opposite one another, the spring ring 9 reduces its external diameter and a portion of the spring ring 9 moves radially into the bead 7 and forms a block. This limits the movement of the telescopic tube 4 in the drawout direction.

FIG. 3 shows an enlarged illustration of the beads 7, 8 located opposite one another. Both beads 7, 8 have an asymmetric cross sections. The depth of the two beads 7, 8 is delimited by a bead base 11, 12 in each case. The bead base 11, 12 is followed in a ramp-like manner in the upward direction, and thus in the extending direction, by first side walls 13, 14. Second side walls 15, 16 which form stops in the push-in direction are formed on the opposite side. The first side walls 13, 14 extend toward the outer circumference of the guide bushing 3 and of the telescopic tube 4, respectively, at a shallow angle in relation to the longitudinal axis of the column unit 1. The second side walls 15, 16, in contrast, are oriented approximately perpendicularly to the longitudinal axis of the column unit 1 and likewise run to the outer circumference of the guide bushing 3 and of the telescopic tube 4, respectively.

In FIG. 3, the spring ring 9 is located in the bead 7 of the telescopic tube 4. The bead 7 has a depth which is smaller than the cross section of the spring ring 9. Accordingly, the spring ring 9 is not fully accommodated in the bead 7 such that a portion of the spring ring 9 projects into the bead 8 of the guide bushing 3. If the column unit 1 is moved in the drawout direction, the telescopic tube 4 is carried along in the upward direction by the pneumatic spring. The spring ring 9, which latches into the bead 7 from the bead 8, is carried along by the radially directed second side wall 16 of the telescopic tube 4 and is forced against the ramp-like first side wall 13 of the guide bushing. The spring ring 9 cannot yield. Accordingly, further movement of the telescopic tube 4 is blocked and its drawout movement is thus limited. The beads 7, 8 act as a stop in the drawout direction. In the push-in direction, when the telescopic tube 4 is moved downwards, the first side wall 14 of the telescopic tube 4 carries along the spring ring 9 until the spring ring 9 strikes against the second side wall 15 of the guide bushing, which limits the downward movement of the spring ring 9. The sloping design of the first side wall 14 of the telescopic tube 4 causes the spring ring 9 to be forced outwards as the telescopic tube 4 continues to move downward, i.e., into the upright tube 2, with the result that spring ring 9 widens resiliently. The spring ring 9 is thus expanded on the telescopic tube 4 by the side wall 14. Once the bead 7 is moved below the bead 8, the spring ring 9 is once again accommodated in the bead 8 of the guide bushing 3.

The column unit 1 in FIG. 4 has the same construction as in FIG. 1. The bead 7 is shown as a separate part that is connected to the telescopic tube 4. Instead of the spring ring 9, the securing element used in this embodiment is a spring element 17 with a plurality of radially inwardly resilient tongues 18. The spring element 17 is clamped in between the upright tube 2 and the guide bushing 3. In addition, the guide bushing 3 has a plurality of radially continuous recesses 19 corresponding to the number of tongues 18. The recesses 19 are designed such that the tongues 18 can pass through the recesses during their radial movement. In the position of the column unit shown in FIG. 4, the telescopic tube 4 forces the tongues 18 radially outwards such that they are fully accommodated in the recesses 19.

If the bead 7 in telescopic tube 4 and the recesses 19, as is illustrated in FIG. 5, are located opposite one another, the tongues 18 relax radially inwards on account of their elasticity. In this case, the tongues 18 pass through the recesses 19 into the bead 7. The bead 7 has a cross section as in FIG. 3. In the case of a drawout movement of the telescopic tube 4, the bottom side wall 16 forces the tongues 18 upwards. However, the tongues 18 cannot be deformed any further, thereby forming a stop for the telescopic tube 4 which limits the drawout movement. During a push-in movement of the telescopic tube 4, the side wall 14 runs on the tongues 18 and forces the tongues out of the bead 7, in the radially outward direction, and into the recesses 19. The telescopic tube 4 is released by the spring element 17 and can be pushed in.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A column unit, comprising:
   a fixed upright tube having a bottom upright-tube end and a top upright-tube end;
   a telescopic tube axially displaceably guided in said upright tube for moving between a fully inserted position to a maximally withdrawn position;
   a pneumatic spring having a cylinder and a piston rod, said cylinder being axially displaceably guided in said telescopic tube, said piston rod having a free end projecting out of said cylinder and fastened to said upright tube proximate said bottom upright-tube end, said cylinder having a carry-along stop for carrying the telescopic tube out of said upright tube when said pneumatic spring is moved axially; and
   a securing element arranged on said upright tube for limiting an axial movement of said telescopic tube out of said upright tube, said securing element being urged resiliently radially inward such that said securing element abuts an outer cylindrical lateral surface of said telescopic tube, wherein a latching recess is defined on said outer cylindrical lateral surface of said telescopic tube, said securing element being latchable in said latching recess when said telescopic tube is withdrawn from said upright tube to said maximally withdrawn position to thereby prevent further withdrawal of said telescopic tube from said upright tube.

2. The column unit of claim 1, wherein said latching recess is arranged in an end region of said telescopic tube directed towards said bottom upright-tube end.

3. The column unit of claim 1, wherein a securing recess is arranged in said upright tube, said recess being open toward said telescopic tube, wherein said securing element is arranged in said securing recess.

4. The column unit of claim 1, further comprising a guide bushing firmly inserted in said upright tube, said telescopic tube being axially displaceably guided in said guide bushing.

5. The column unit of claim 4, wherein a securing recess is arranged in said guide bushing of said upright tube, said recess being open toward said telescopic tube, wherein said securing element is arranged in said securing recess.

6. The column unit of claim 3, wherein the radial depth of said securing recess in said upright tube corresponds approximately to a radial extent of said securing element.

7. The column unit of claim 3, wherein said securing recess of said upright tube comprises a securing bead having an annular encircling groove.

8. The column unit of claim 7, wherein said securing bead has an asymmetric cross section.

9. The column unit of claim 8, wherein said securing bead has a radially inner bead base, a first side wall which is closer to the top upright-tube end, and second a side wall which is further away from the top upright-tube end, said first side wall being inclined in a ramp-like manner in relation to the top upright-tube end and said second side wall extending to the inner cylindrical lateral surface of the guide bushing approximately perpendicular to the longitudinal axis of the column unit.

10. The column unit of claim 1, wherein said latching recess of said telescopic tube comprises a latching bead having an annular encircling groove.

11. The column unit of claim 10, wherein said latching bead has an asymmetric cross section.

12. The column unit of claim 11, wherein said latching bead has a radially inner bead base, a first side wall which is closer to the top upright-tube end, and second a side wall which is further away from the top upright-tube end, said first side wall being inclined in a ramp-like manner in relation to the top upright-tube end and said second side wall extending to the inner cylindrical lateral surface of the guide bushing approximately perpendicular to the longitudinal axis of the column unit.

13. The column unit of claim 3, wherein at least one of said latching recess and said securing recess is produced by deformation or machining.

14. The column unit of claim 1, wherein said latching recess is arranged as a separate component on said telescopic tube.

15. The column unit claim 3, wherein said securing element is arranged with radially inwardly directed pre-stressing in said securing recess of said upright tube.

16. The column unit claim 1, wherein said securing element is made of an elastic material.

17. The column unit of claim 16, wherein said securing element is made of metal.

18. The column unit of claim 1, wherein said securing element comprises a spring element having radially inwardly directed tongues.

19. The column unit of claim 1, wherein said securing element is a spring ring.

20. The column unit of claim 9, wherein said latching recess of said telescopic tube comprises a latching bead having an annular encircling groove, wherein said latching bead has a radially inner bead base, a first side wall which is closer to the top upright-tube end, and second a side wall which is further away from the top upright-tube end, said first side wall being inclined in a ramp-like manner in relation to the top upright-tube end and said second side wall extending to the inner cylindrical lateral surface of the guide bushing approximately perpendicular to the longitudinal axis of the column unit.

* * * * *